3,268,395
METHOD OF COMBATTING ACARIDS
James L. Taylor, Gainesville, Fla., assignor to Thompson-Hayward Chemical Company, Kansas City, Kans., a corporation of Delaware
No Drawing. Filed Feb. 12, 1965, Ser. No. 436,988
9 Claims. (Cl. 167—30)

This invention is concerned with an acaricide, and, more particularly, it relates to a composition containing a particular chemical compound which, when diluted within a solid, finely divided carrier or suspended in a liquid medium, and applied to the foliage of plants, during or after a commencement of growth, is useful to control the appearance of mites, particularly the citrus rust mite.

Several chemical agents are available for the control of mites, and they vary greatly in their nature, simply because the number of mites to be controlled is likewise very large and varied. Conditions under which the acaricide must be effective are also very variable.

It also has been a common observation that the mite species very quickly develops a resistance to acaricides. This does not eliminate the usefulness of the materials except in those areas where, after a few generations, the newer generations of mites suddenly appear with relatively well developed resistances against the miticide in use. It is then necessary or desirable to switch suddenly to a different miticide against which there has been no development of immunity.

It is, accordingly, a fundamental object of this invention to provide a composition in solid or liquid form suitable for application to plants as a control against mites, particularly the citrus rust mite.

It is another object of the invention to provide an acaricide of an organo metallic nature, more specifically, an organo tin compound useful as a follow-up acaricide in areas where the more strictly organic type compounds have lost their usefulness through the development of immunities by the mites.

Other objects and advantages of the invention will in part be obvious and in part appear hereinafter.

The composition contemplated by the instant invention includes a formulation of a finely divided solid or liquid organo-tin compound in a finely divided solid carrier, such as chalk, clay, pumice, silica, alumina, sulfur, and diatomaceous earth applied by dusting. These compositions are mixed with water to the desired strength for spraying on plants. It is possible to use other pesticides in combination with these compositions for multipurpose applications.

The chemical compounds most useful for the purposes are triphenyl tin compounds corresponding to the general formula:

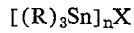

wherein n may be 1 or 2, R represents the phenyl group, and X is an organic or inorganic group, for example, acetate, chloride, hydroxide, oxygen of a bis form of the compound and the like. The phenyl groups may be alkylated, or alkoxylated substituted with chlorine, e.g., mono to penta chloro substituents may be used. Similarly, the phenyl group may carry OH substituents with or without the alkyl or chlorine groups.

Useful compounds for the purposes are listed as follows: triphenyl tin hydroxide, . . . chloride, . . . acetate, propionate, benzoate, sulfide, disulfide, sulfate, borate, oxalate, bromide, succinate, phthalate, p-toluene, sulfonate, ethylene bis-dithiocarbamate and bis triphenyl tin oxide.

Tri (chloro) phenyl tin hydroxide, (the di, tri, tetra, penta forms), . . . chloride, acetate, chloracetate, etc. and the bis tin oxide forms.

Bis triphenyl tin oxide, bis chlorophenyl, bis hydroxyphenyl, bis alkylphenyl, bis alkoxyphenyl, etc., variants wherein a chlorine atom, alkyl, alkoxyl or OH group is included in one or more of the H positions of the phenyl.

The control of mites is particularly difficult and necessary in the cultivation of food plants. That is, the plant must be healthy to produce useful food. In many cases, the foliage itself is the useful portion of the plant. Thus, the control of rust mites, such as the citrus fruit mite, *Phyllocoptruta oleivora,* and others by application of triphenyl tin hydroxide, and other compounds included in the definition, to all above ground portions of plants is accomplished by spray and dust application techniques. The compound is effective in killing the mites, on contact, in small doses and has the advantage that residues on the fruit can be removed readily or decomposed.

Various specific embodiments of the invention illustrated in the following examples will illustrate its scope:

*Example 1.*—Field test of triphenyl tin hydroxide as a citrus miticide:

Triphenyl tin hydroxide was used at a concentration of 20, 2, and 1 parts per million for the control of the citrus rust mites, *Phyllocoptruta oleivora* and *Aculus pelekassi.* The activity of triphenyl tin hydroxide appears to commence at an economically useful and effective level at 1 and 2 parts per million.

The mites were reared in a standard manner, on orange seedlings, in greenhouses at 70–85° F. They were transferred to clean citrus seedlings. Migration of the mites to uninfested leaves was prevented by applying lanolin to the bases of the leaves. The infested seedlings were dipped in water-acetone suspensions of the experimental chemical within 24 hours after infestation.

Tests were conducted at various levels of concentration. It is always desirable to identify the approximate minimum level of application and it is most useful if the level at which the acaricide is useful is very low. This minimizes problems of residues on the food plants. Known concentrations of suspensions were made up and, by dilution, several others were prepared and tested. In speaking of concentrations, it is possible to speak in terms of solid powder diluents or liquid diluents. Generally, for the acaricide, I have found the liquid diluent in wettable powder a favorable technique. Dusting with the impalpable powders is effective but it carries the obvious disadvantages of loss in application.

Seedlings were dipped in suspensions being tested. Following treatment, the seedlings were kept in a fume hood until dry and then moved to an air conditioned greenhouse.

Tests with the standard acaricides, Kelthane(4,4'-dichloro-alpha-trichloromethylbenzhydrol), Delnav[2,3-p-dioxane 5,5-bis-(O,O-diethyl phosphorodithioate)], and ethion(O,O,O',O'-tetraethyl 5,5'-methylene bis phosphorodithioate), give rust mite control of 75–100% at concentrations of 5 parts per million and 100% at 20 parts per million in tests against both *Phyllocoptruta oleivora* and *Aculus pelekassi.* Carbonphenothion 5-[(p-chlorophenylthio)methyl]O,O-diethyl phosphorodithioate, and chlorobenzilate(ethyl 4,4'-dichlorobenzilate), give similar results in tests against P. oleivora but these materials are not as effective in tests against A. pelekassi.

EFFECTIVENESS [1] OF TRIPHENYL TIN HYDROXIDE IN SCREENING TESTS AGAINST CITRUS RUST MITES

| Concentration (p.p.m.) | P. oleivora | A. pelekassi |
|---|---|---|
| | Percent | Percent |
| 20 | 100 | 100 |
| 2 | 93 | 100 |

[1] Average of 2 replicates, each obtained from counts for upper and lower sides of 2 leaves.

PERCENT MORTALITY OF CITRUS RUST MITES 72 HOURS AFTER TREATMENT AT INDICATED CONCENTRATION OF TRIPHENYL TIN HYDROXIDE

| Species | Concentration (p.p.m.) | | | | |
|---|---|---|---|---|---|
| | .05 | .1 | .5 | 1.0 | 2.0 |
| .oleivora | 3 | 7 | 18 | 57 | 73 |
| A. pelekassi | 0 | 7 | 45 | 66 | 96 |

Example II.—Comparative tests of triphenyl tin chloride, triphenyl tin acetate, and triphenyl tin hydroxide in a different formulation were also tested. The test procedure followed was the same followed as that of Example I where the test seedling was a Honey Orange, reared in air conditioned greenhouses and exposed to mites following the same technique.

Citrus rust mite mortality was estimated 72 hours after treatment. Each test was made in duplicate using two infested plants for each test. Mite counts were made both on the upper and lower surface of one leaf from each plant, for a total of eight mortality estimates. These estimates were averaged and are tabulated below.

Standard acaricides in technical grade samples such as Kelthane(4,4' - dichloro - alpha - trichloromethylbenzhydrol), dioxathion[2,3-p-dioxane 5,5-bis(O,O-diethylphosphorodiethioate)], and ethion(O,O,O',O'-tetraethyl 5,5'-methylene bis phosphorodithioate), usually cause 85–100% mortality at concentrations of 5 parts per million and 100 mortality at 20 parts per million in tests against both Phyllocoptruta oleivora and Aculus pelekassi. Carbophenothion 5 - [(p - chloro-phenylthio)methyl]O,O-diethyl phosphorodithioate, and chlorobenzilate(ethyl 4,4'-dichlorobenzilate), give similar results in tests against P. oleivora, but these materials are not as effective in tests against A. pelekassi.

EFFECTIVENESS OF EXPERIMENTAL MATERIALS IN SCREENING TESTS AGAINST RUST MITES ON CITRUS

| Chemical | Concentration (p.p.m.) | Estimated percent mortality | |
|---|---|---|---|
| | | A. pelekassi | P. oleivora |
| 1. Triphenyl tin chloride | 20 | 100 | 100 |
| 2. Triphenyl tin acetate | 20 | 84 | 22 |
| Triphenyl tin chloride | 2 | 100 | 95 |

In a reinspection, 6 weeks following application, of the field test with triphenyl tin hydroxide, it was found that triphenyl tin hydroxide was still effective. It appeared more persistent and more effective in tests, in this instance, than chlorobenzilate(ethyl 4,4'-dichlorobenzilate), which is the standard for rust mites. In evaluating the field tests, it is always necessary to interpret the data in terms of the season because the rust mite population is itself seasonal. That is, while an miticide (acaricide) might be present and seem effective in small amounts, when the mite population is at its peak, the counts should be so interpreted.

The following table will summarize the extended time readings of test mite population in a field test conducted with triphenyl tin hydroxide:

| Material | Amount formulation per 100 gallons | Percent* of Infested leaves at indicated intervals after treatment | | | |
|---|---|---|---|---|---|
| | | 0 day | 11 days | 34 days | 53 days |
| | Pounds | | | | |
| Check | | 45 | 63 | 79 | 77 |
| TPTH 20% | 1.5 | 63 | 0.7 | 1.7 | 1.3 |
| TPTH 20% | 3.0 | 56 | 0 | 0 | 2.0 |
| Chlorobenzilate 25% | 0.5 | 51 | 1.7 | 1.7 | 5.7 |

*Based on examination of 300 leaves.

Since the lethal level for control is below 20 parts per million, a convenient method for control of mites is to apply the dust or suspension to the plants to be controlled and, as a follow-up, based on observation or measurement, to reapply it a week or ten days later to maintain a miticidal level on the plant.

The advantage of the tin compounds as miticides is that they retain a good residual effectiveness in the period when the mite population peaks and the compounds are gradually removed by weathering. In the soil, the compound decomposes to innocuous tin oxide by hydrolysis through a period of time. To the extent that the triphenyl tin hydroxide carries over to fruit or any other product in the market, it can be removed through ordinary washing methods. Normally, however, the solid powder deposited by spraying or dusting is only lightly adhered to the plant or surface of the fruit and is readily removed by simple washing or abrasion which occurs in polishing the fruit.

Organo-tin test formulations made in accordance with the specific examples were applied to plants by dusting or by spraying a suspension. Observations were made of the occurrence of the several species of rust mites on control plants, untreated, in an area adjacent to that in which the treated plants were being observed.

To formulate a dusting powder, the organo-tin compound is finely pulverized and mixed with an appropriate portion of an inert carrier such as talc, clay, calcium, carbonate, gypsum, chalk, pumice, silica, alumina, sulfur, and diatomaceous earth which also has been reduced to a micro degree of fineness. If desired, grinding may follow admixing the organo-tin compound and inert carrier. The components can be blended in conventional powder blenders.

To formulate a water suspendable powder, suitable surface active agents are included in the finely ground mixture of organo-tin compound and carrier. Usually, a few percent (1% to 5%) of a selected commercial anionic, cationic or nonionic wetting agent. Together with a suitable stabilizing or suspending agent are needed to permit the formulation to be readily suspended in water and resistant to flocculation or rapid settling.

What is claimed is:

1. A method of combatting acarids which comprises applying to acarids of the family Eriophyidae a small but effective amount of a member selected from the group consisting of compounds of the formulae:

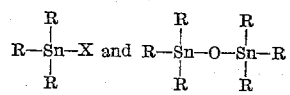

wherein X is selected from the group consisting of hydroxy, acyloxy and halo; and each R is selected from the group consisting of phenyl, chlorophenyl and alkoxyphenyl.

2. The method of claim 1 wherein the compound is triphenyltin hydroxide.

3. The method of claim 1 wherein the compound is triphenyltin acetate.

4. The method of claim 1 wherein R is phenyl.

5. The method of claim 1 wherein the compound is triphenyltin chloride.

6. The method of claim 1 wherein the compound is applied to the acarids in a concentration of at least about one part per million.

7. The method of claim 1 wherein the compound is applied to the acarids in a concentration of from at least about one to about twenty parts per million.

8. The method of claim 1 wherein the acarids are rust mites.

9. The method of claim 1 wherein the acarid is selected from the group consisting of the species *Phyllocoptruta oleivora* and *Aculus Pelekassi*.

References Cited by the Examiner

UNITED STATES PATENTS

| 2,957,785 | 10/1960 | Leatherlands | 167—30 |
| 3,031,483 | 4/1963 | Koopmans | 167—30 |

FOREIGN PATENTS

| 946,770 | 1/1964 | Great Britain. |

OTHER REFERENCES

Spivastava, T. N.: Chem. Abstracts, vol. 60 (1964), p. 15900C.

JULIAN S. LEVITT, *Primary Examiner.*

STANLEY J. FRIEDMAN, *Assistant Examiner.*